United States Patent
Kruspe et al.

(10) Patent No.: US 9,448,312 B1
(45) Date of Patent: Sep. 20, 2016

(54) DOWNHOLE FIBER OPTIC SENSORS WITH DOWNHOLE OPTICAL INTERROGATOR

(71) Applicants: Thomas Kruspe, Wietzendorf (DE); Sebastian Jung, Isernhagen (DE); Sebastian Csutak, Houston, TX (US)

(72) Inventors: Thomas Kruspe, Wietzendorf (DE); Sebastian Jung, Isernhagen (DE); Sebastian Csutak, Houston, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 0 days.

(21) Appl. No.: 14/645,122

(22) Filed: Mar. 11, 2015

(51) Int. Cl.
| | |
|---|---|
| G01B 11/16 | (2006.01) |
| G01V 1/18 | (2006.01) |
| G02B 6/02 | (2006.01) |
| G01H 9/00 | (2006.01) |
| G01K 11/32 | (2006.01) |
| G01V 8/16 | (2006.01) |

(52) U.S. Cl.
CPC .............. *G01V 1/186* (2013.01); *G01B 11/16* (2013.01); *G01H 9/004* (2013.01); *G01K 11/3206* (2013.01); *G01V 8/16* (2013.01); *G02B 6/02076* (2013.01)

(58) Field of Classification Search
CPC ...... E21B 36/04; E21B 43/24; E21B 17/028; E21B 36/001; E21B 43/243; E21B 21/08; E21B 7/14; E21B 7/15; E21B 10/60; E21B 21/00; E21B 21/103; E21B 29/00; E21B 43/11; E21B 2021/006; E21B 47/122
See application file for complete search history.

(56) References Cited

U.S. PATENT DOCUMENTS

| | | |
|---|---|---|
| 5,767,411 A | 6/1998 | Maron |
| 6,069,686 A | 5/2000 | Wang et al. |
| 6,072,567 A | 6/2000 | Sapack |
| 6,388,251 B1 | 5/2002 | Papanyan |
| 7,373,046 B2 | 5/2008 | Sahlgren et al. |
| 7,894,061 B2 | 2/2011 | MacDougall et al. |
| 8,035,822 B2 | 10/2011 | Riza et al. |
| 8,180,185 B2 | 5/2012 | Xia et al. |
| 8,218,916 B2 | 7/2012 | Chen |

(Continued)

FOREIGN PATENT DOCUMENTS

WO 2013052932 A1 4/2013

OTHER PUBLICATIONS

Lee, Byoungho, "Review of the Present Status of Optical Fiber Sensors", Optical Fiber Technology 9 (2003), pp. 57-79. http://wr.lib.tsingh.ua.edu.cn/sites/def.

(Continued)

*Primary Examiner* — Michael P Stafira
(74) *Attorney, Agent, or Firm* — Cantor Colburn LLP

(57) ABSTRACT

An apparatus for sensing a parameter beneath a surface of the earth includes an optical fiber disposed beneath a surface of the earth and comprising at least one fiber Bragg grating sensor configured to sense the parameter and a wide-band light source disposed beneath the surface of the earth and configured to emit light in a wide band of wavelengths to illuminate the at least one fiber Bragg grating. An optical interrogator is disposed beneath the surface of the earth and configured to receive light reflected by the at least one fiber Bragg grating sensor and to transform a shift in wavelength of the reflected light into a variation of light intensity. A photo-sensor is configured to measure intensity of light received from the optical interrogator. Electronics are coupled to the photo-sensor and configured to measure a voltage representing the light intensity at the photo-sensor to sense the parameter.

19 Claims, 16 Drawing Sheets

(56) References Cited

U.S. PATENT DOCUMENTS

| | | |
|---|---|---|
| 8,581,580 B2 | 11/2013 | Maida, Jr. et al. |
| 2007/0047867 A1* | 3/2007 | Goldner ................ E21B 47/101 385/12 |
| 2007/0126594 A1 | 6/2007 | Atkinson et al. |
| 2009/0074348 A1 | 3/2009 | Xia |
| 2010/0259752 A1 | 10/2010 | Shah et al. |
| 2011/0048136 A1 | 3/2011 | Birch et al. |
| 2011/0110620 A1* | 5/2011 | Childers ............ E21B 47/0006 385/13 |
| 2011/0110621 A1* | 5/2011 | Duncan .................. E21B 47/06 385/13 |
| 2012/0092960 A1 | 4/2012 | Gaston et al. |
| 2012/0111104 A1 | 5/2012 | Taverner et al. |
| 2012/0216615 A1 | 8/2012 | Andersen et al. |
| 2012/0257475 A1 | 10/2012 | Luscombe et al. |
| 2012/0321242 A1 | 12/2012 | Schade et al. |
| 2013/0056626 A1* | 3/2013 | Shen ...................... E21B 47/10 250/269.1 |
| 2013/0094011 A1* | 4/2013 | Barry ..................... G01S 17/08 356/4.01 |
| 2013/0175438 A9 | 7/2013 | Ford et al. |
| 2013/0340518 A1* | 12/2013 | Jones .................... E21B 49/005 73/152.55 |
| 2014/0110124 A1* | 4/2014 | Goldner .............. E21B 47/1025 166/337 |
| 2014/0139841 A1* | 5/2014 | Koste ................. G01D 5/35358 356/477 |
| 2015/0177411 A1* | 6/2015 | Childers .................. G01V 8/16 250/269.1 |
| 2015/0198037 A1* | 7/2015 | Van Hal ................ G01N 33/20 73/152.42 |
| 2015/0233236 A1* | 8/2015 | Johnston ............... E21B 47/123 73/152.16 |
| 2015/0308864 A1* | 10/2015 | Paulsson .................. G01V 1/48 73/152.16 |

OTHER PUBLICATIONS

Norman, et al, "Interrogation of fibre Bragg grating sensors using an arrayed waveguide grating", Measurement Science and Technology, vol. 16, No. 3, Mar. 2005, 3 pages, Abstract only.

Notification of Transmittal of the International Search Report and the Written Opinion of the International Searching Authority, or the Declaration; PCT/US2016/020434; Mailing Date May 27, 2016, 13 pages.

* cited by examiner

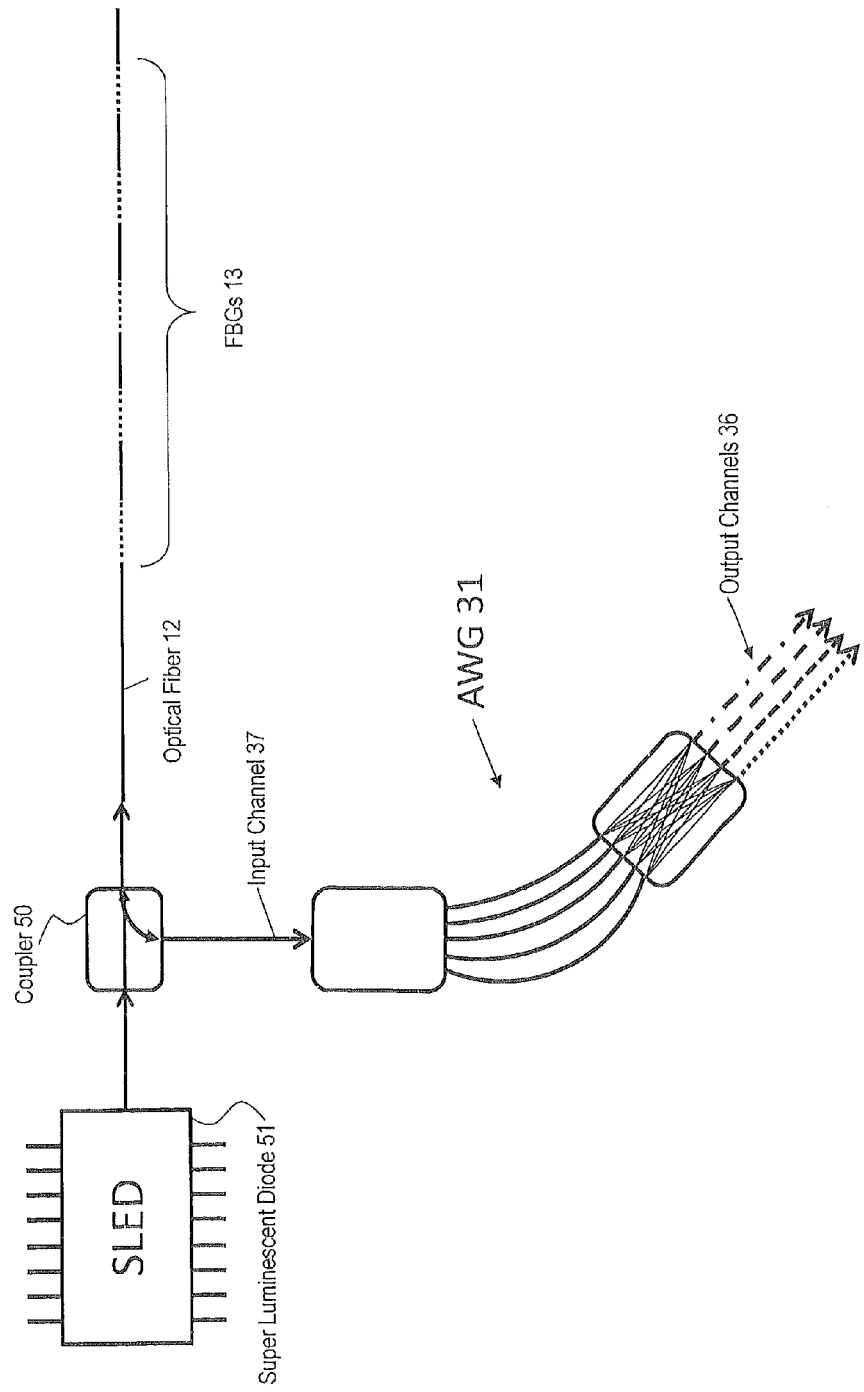

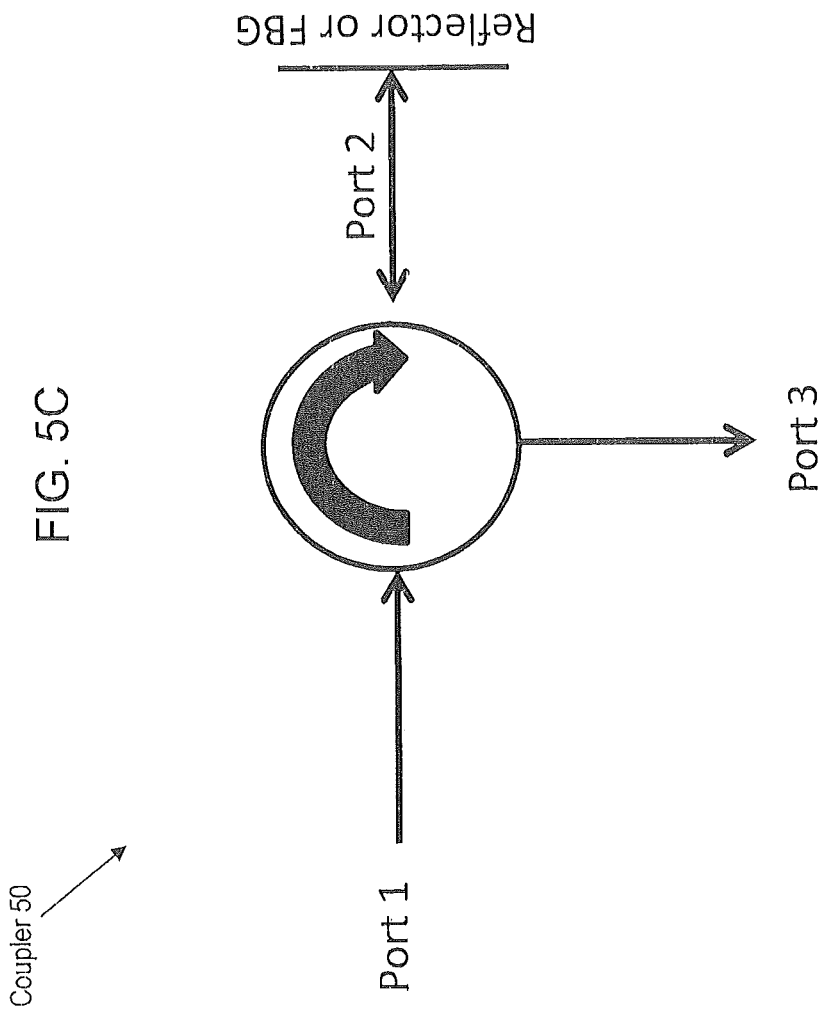

US 9,448,312 B1

DOWNHOLE FIBER OPTIC SENSORS WITH DOWNHOLE OPTICAL INTERROGATOR

BACKGROUND

Boreholes are drilled into the earth for many applications such as hydrocarbon production, geothermal production, and carbon dioxide sequestration. In order to efficiently use expensive resources drilling the boreholes, it is important for analysts to acquire detailed information related to the geologic formations being drilled.

Various types of tools referred to as downhole tools may be conveyed through the boreholes to perform various types of measurements to provide the analysts with the needed information. One category of tools uses fiber-optic sensors with some of them containing Fiber Bragg gratings (FBGs) as the sensing element. In general, a series of gratings can be written into an optical fiber to produce a corresponding series of sensors. Typically, the FBGs are interrogated by illuminating the optical fiber with a tunable stable laser. Because the wavelength of light output by the laser is dependent on temperature, the wavelength of the laser light can fluctuate with temperature if the laser is disposed along with the FBGs in a borehole where temperatures can reach as much as 175° C. Such temperature changes can result in inaccurate or meaningless readings of the FBGs or in requiring a very complicated tunable laser system. Hence, it would be appreciated in the drilling and production industries if apparatus and associated method for interrogating FBGs were developed that could be deployed completely downhole and still accurately read the FBGs.

BRIEF SUMMARY

Disclosed is an apparatus for sensing a parameter beneath a surface of the earth. The apparatus includes: an optical fiber disposed beneath a surface of the earth and comprising at least one fiber Bragg grating sensor configured to sense the parameter; a wide-band light source disposed beneath the surface of the earth and configured to emit light in a wide band of wavelengths, the light source being in optical communication with the optical fiber in order to illuminate the at least one fiber Bragg grating; an optical interrogator disposed beneath the surface of the earth and configured to receive light reflected by the at least one fiber Bragg grating sensor and to transform a shift in wavelength of the reflected light into a variation of light intensity, a photo-sensor disposed beneath the surface of the earth and configured to measure intensity of light received from the optical interrogator; and electronics coupled to the photo-sensor and configured to measure a voltage representing the light intensity at the photo-sensor to sense the parameter.

Also disclosed is a method for sensing a parameter beneath a surface of the earth. The method includes: disposing an optical fiber beneath a surface of the earth, the optical fiber comprising at least one fiber Bragg grating sensor configured to sense the parameter; illuminating the at least one fiber Bragg grating sensor using a wide-band light source disposed beneath the surface of the earth, the light source being configured to emit light in a wide band of wavelengths; receiving light reflected by the at least one fiber Bragg grating sensor using an optical interrogator disposed beneath the surface of the earth, the optical interrogator being configured to transform a shift in wavelength of the reflected light into a variation of light intensity; measuring intensity of light received from the optical interrogator using a photo-sensor disposed beneath the surface of the earth; measuring a voltage representing the light intensity at the photo-sensor to sense the parameter using electronics coupled to the photo-sensor.

BRIEF DESCRIPTION OF THE DRAWINGS

The following descriptions should not be considered limiting in any way. With reference to the accompanying drawings, like elements are numbered alike:

FIGS. 5A-5C, collectively referred to as FIG. 5, depict aspects of a sensor array having one optical sensing fiber with distributed sensors that are illuminated by a single super luminescent diode;

DETAILED DESCRIPTION

A detailed description of one or more embodiments of the disclosed apparatus and method presented herein by way of exemplification and not limitation with reference to the figures.

Disclosed are method and apparatus for sensing a parameter of interest downhole using an optical fiber. The optical fiber may have one fiber Bragg grating (FBG) or a series of FBGs. An optical interrogator having an arrayed waveguide grating (AWG) is configured to interrogate each of the FBGs to measure a temperature, strain imposed upon each of the FBGs or a property changing the reflective index of the fiber at the location of the FBG such as a chemical substance interacting with the fiber and corresponding location of the FBGs. The optical interrogator having the AWG is compatible with a wide-band light source for illuminating the FBGs, thereby eliminating the need for a tunable stable laser. By using a wide-band light source, the optical interrogator can be configured to be disposed downhole where temperatures can be as high as about 175° C. and still provide accurate readings of the FBGs.

Figure 1:
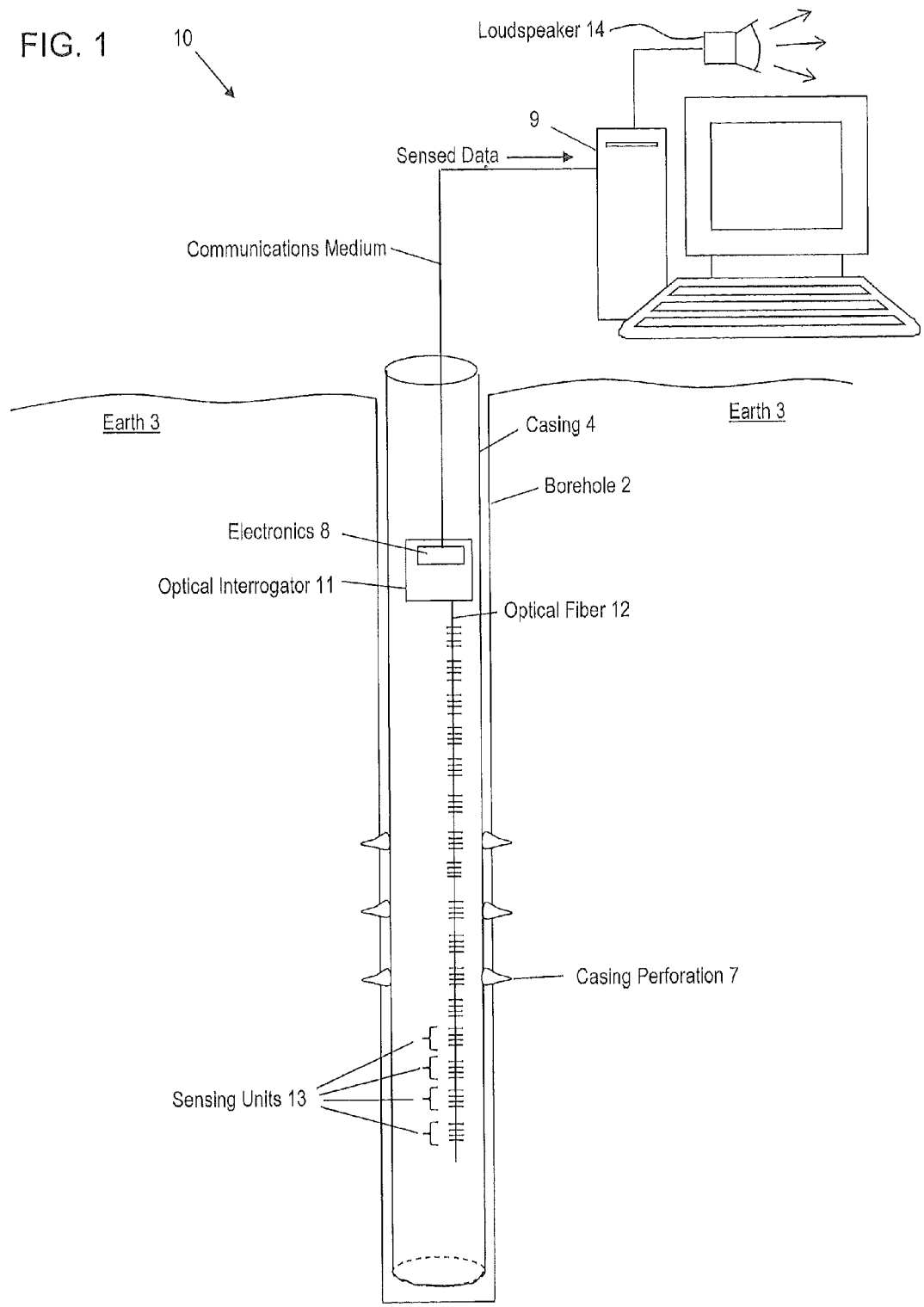
FIG. 1 illustrates a cross-sectional view of an embodiment of optical fiber distributed sensors disposed in a borehole penetrating the earth.

Referring now to FIG. 1, a simplified schematic diagram of an optical sensing system 10 is illustrated. The optical sensing system 10 includes an optical interrogator 11 in optical communication with an optical fiber 12. The optical fiber 12 includes a series of sensing units 13 spaced apart from each other along the optical fiber 12. Each sensing unit includes a fiber Bragg grating (FBG) as known in the art and may be referred to as a FBG 13 or FBG sensing unit 13.

Figure 2:
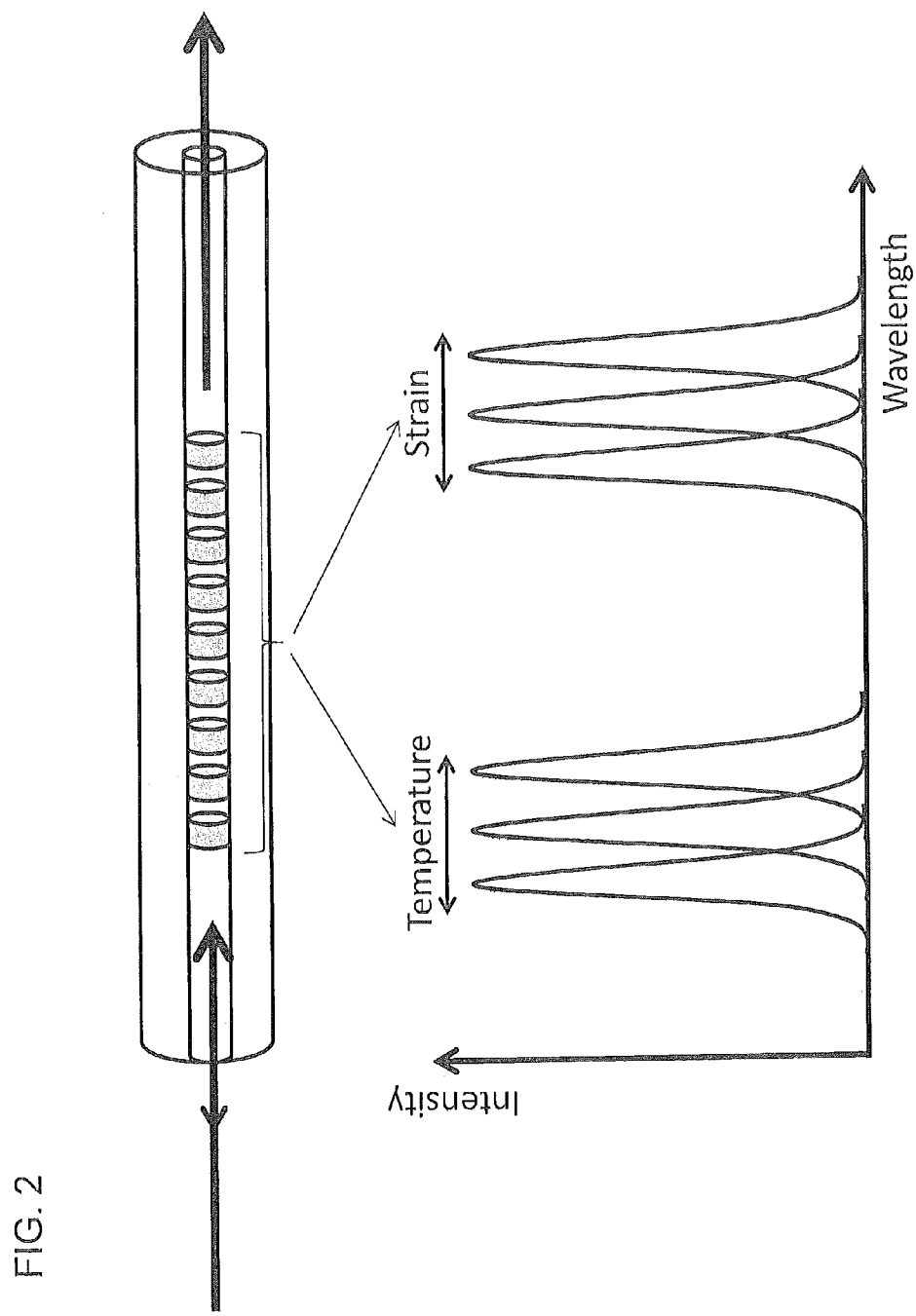
FIG. 2 depicts aspects temperature and strain responses of the sensors.

The fiber Bragg grating is made up of a series of changes in index of refraction, as illustrated in FIG. 2, that reflect light having a resonant wavelength which may also be referred to a central wavelength. To either side of the central wavelength are decreasing tails. When a temperature change or strain or a variation of index of reflection is imposed on a FBG, the central wavelength shifts accordingly. Hence, by measuring the central wavelength shift, the temperature change (and resulting temperature) or strain or variation of index of refraction may be estimated from the measurement.

Referring back to FIG. 1, the optical interrogator 11 is disposed in a borehole 2 penetrating the earth 3, which may include a formation. The optical interrogator 11 is configured to interrogate each of the FBGs 13 in order to measure the central wavelength shift and potentially the FBG location along the optical fiber by evaluating the travel time of light. The optical interrogator 11 may also be configured to estimate the temperature change or strain at each FBG location using the central wavelength shift and location information. The optical interrogator 11 may also be configured to transmit the central wavelength shift and location information to a computer processing system 9 at the surface of the earth or downhole in a drilling tool for example. The computer processing system 9 may be configured to display the estimated temperature, temperature change or strain and corresponding locations to a user via a display or printer. Alternatively or in addition, the computer processing system 9 may store the estimated temperature, temperature change or strain and corresponding locations in memory or a storage medium. Further, the computer processing system 9 may be configured to estimate the temperature, temperature change or strain and corresponding locations using central wavelength shifts and corresponding locations received from the optical interrogator 11. Further, the computer processing system 9 may be configured to convert the strains due to acoustic waves measured by the FBGs to electrical signals which may then the transmitted to a loudspeaker 14 for broadcasting to a user. Hence, in this embodiment, the FBGs may be used as acoustic microphones. Electronics 8 in the optical interrogator may be used for processing data and to provide a telemetry interface for transmitting sensed data from the optical interrogator 11 to the computer processing system 9.

Still referring to FIG. 1, the optical fiber 12 may be coupled to a downhole structure such as a casing 4 lining the borehole 2. In this embodiment, the distributed sensors of the optical fiber 12 may be used to monitor the health of the casing 4 by monitoring strains experienced by the casing 4. Alternatively or in addition, the distributed sensors may be used as microphones to monitor the flow of liquids into the casing 4 such as through casing perforations 7. Similarly, the effectiveness of acid treatments to improve flow may be monitored.

Figure 3:
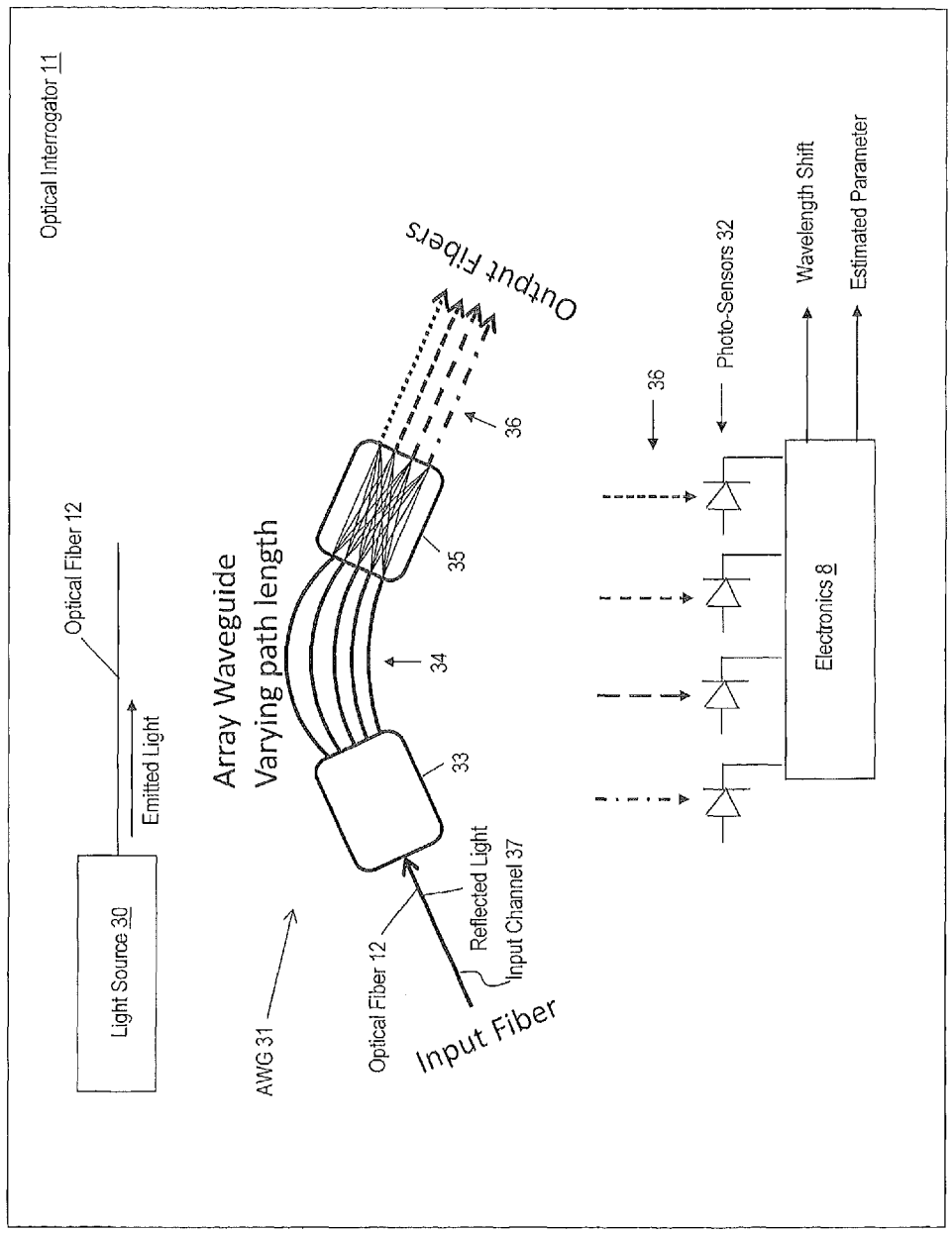
FIG. 3 depicts aspects of an optical fiber interrogator having an arrayed waveguide grating (AWG)

FIG. 3 depicts aspects of the optical interrogator 11. The optical interrogator 11 includes a wide-band light source 30, an arrayed waveguide grating (AWG) 31, and a photo-sensor 32. The light source 30 such as a wide band laser diode (LD) or super luminescent diode (SLED) is configured to emit light over range of wavelengths and is not required to be tuned to a specific wavelength. Hence, the light source 30 is not adversely affected by the high downhole temperatures that can reach as much as 175° C. and which can cause a narrow-band light source to vary its output wavelength. The term "wide range" relates to the light source 30 emitting light over a range of wavelengths necessary to interrogate a plurality of FBGs in the optical sensing system 10. In one or more embodiments, the wide band light source 30 is configured to emit light having wavelengths in a range from 5 nanometers (nm) to 100 nm.

The AWG 31 is configured to receive light generally from an input channel, which receives light reflected from the optical fiber 12, into a free space propagation region 33. From the free space propagation region 33, the light enters a plurality of waveguides 34 where each waveguide has a different length in order to generate phase shifts between light at the exits of the different waveguides. The light at the exits of each of the waveguides enters a free space interference region 35 where the light from each of the waveguides 34 interferes with each other. The light interference in the interference region 35 occurs in such a way that light received in each output channel 36 in a plurality of output channels 36 is in a certain range or band of wavelengths that is different from the band of wavelengths of the other output channels. In general, the range or band of wavelengths of each output channel 36 corresponds to the dynamic sensing range of the corresponding sensing units 13. The result is a spatial and spectral separation of light in the output channels 36. In one or more embodiments, the input channel and/or the output channels may be an optical fiber or optical fibers, respectively. It can be appreciated that the AWG 31 acts as a de-multiplexer for light traveling from the input channel to the output channels and as a multiplexer for light traveling from the output channels to the input channel. Hence, the optical interrogator 11 may have one or more AWGs 31 depending on the configuration of the optical sensing system 10. In configurations having one optical fiber 12 for distributed sensing units, the optical interrogator 11 may have one AWG 31 acting as a de-multiplexer with the optical fiber 12 providing input to the input channel and each of the output channels providing light output to an associated photo-sensor 32 that can measure the light output of the corresponding sensing unit 13. In configurations having multiple optical fibers 12, the optical interrogator 11 may have one light source 30 and one AWG 31 dedicated to each individual optical fiber 12. In other embodiments having multiple optical fibers 12, the optical interrogator may have one light source 30 providing input light to the multiple optical fibers 12 via the input channel of one AWG 31 acting as a de-multiplexer and one AWG 31 dedicated to each optical fiber 12 to de-multiplex light from each of the sensing units in the associated optical fiber for sensing by the photo-sensors 32. In one or more embodiments, the optical interrogator 11 may have one or more AWGs 31 acting as multiplexers in receiving return or reflected light from multiple optical fibers 11, multiplexing that light for transmission to one or more other AWGs 31, which then de-multiplex that light for measuring the central wavelength shift by the photo-sensors 32. It can be appreciated that combinations of the above configurations may also be employed.

The photo-sensor 32 is configured to sense (i.e., measure) an intensity of light received by the photo-sensor 32 at one of the output channels of the AWG 31. In one or more embodiments, the photo-sensor 32 is a photodiode. The electronics 8 are configured to measure the wavelength shift of the central wavelength of the light sensed by the photo-sensor 32. In one or more embodiments, one or more photo-sensors 32 are dedicated to each of the output channels of the AWG 31.

Figure 4:
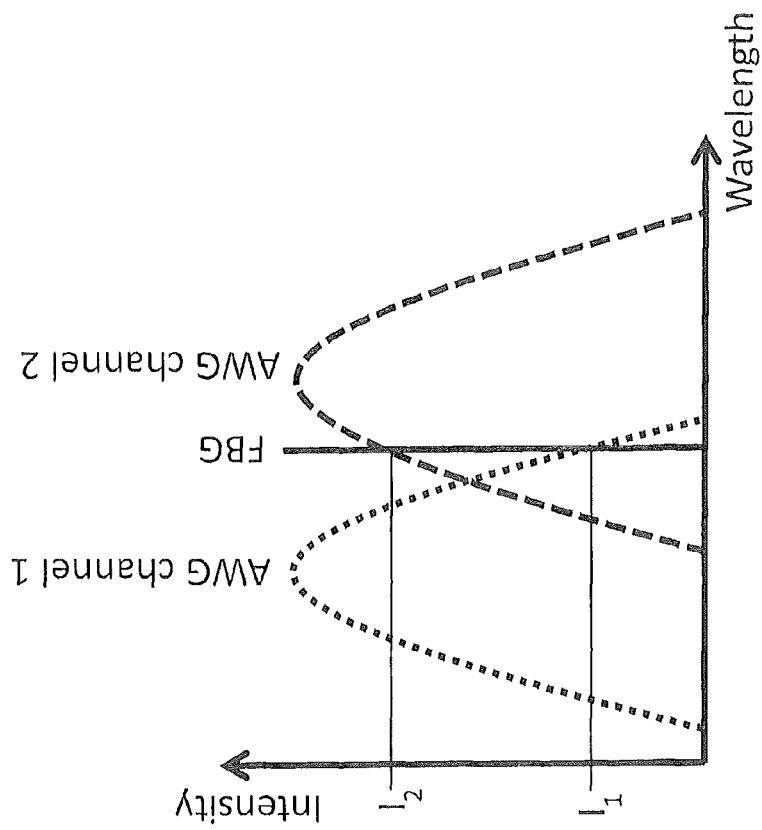
FIG. 4 depicts aspects of a response of the AWG.

FIG. 4 depicts aspects of a response of the AWG 31 having two output channels (channel 1 and 2) corresponding to two channels of the AWG. Changes to the central wavelength of the FBG can be derived from intensity measurements of light exiting the output channels of the AWG.

Figure 5B:
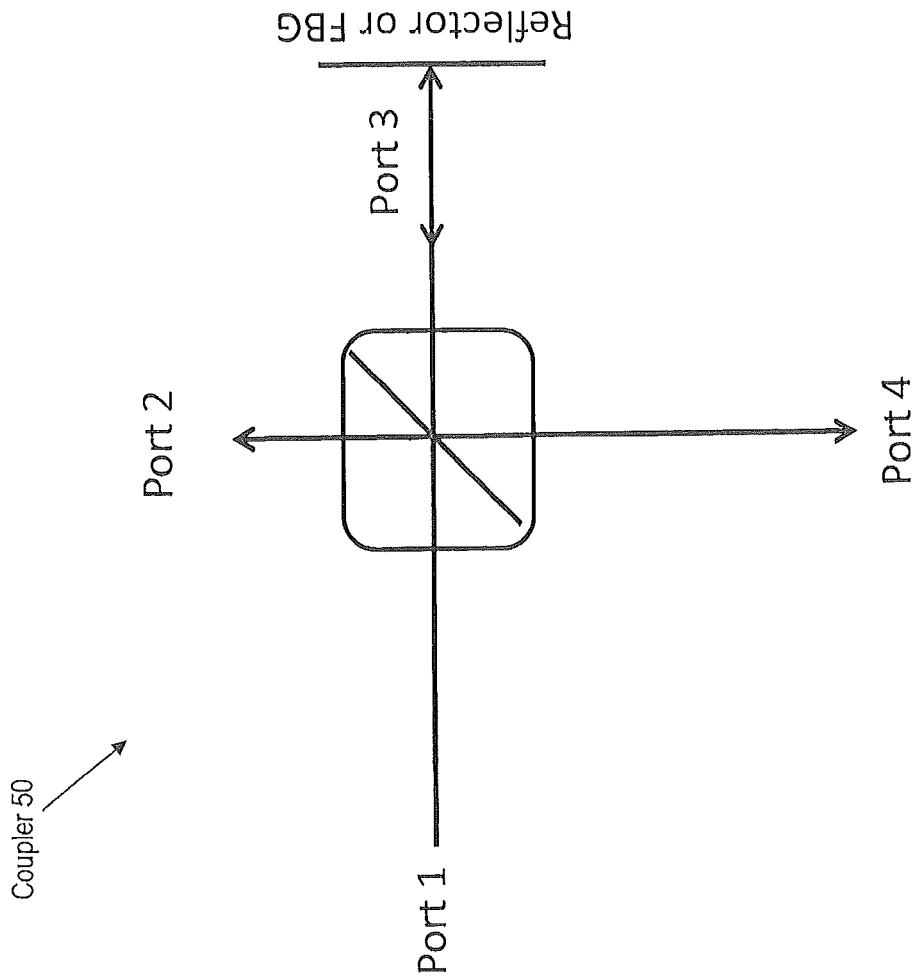

FIG. 5 depicts aspects of an array of FBG sensors in one optical fiber 12. In the embodiment depicted in FIG. 5A, a coupler 50 provides input light from a SLED 51 to the optical fiber 12 in order to illuminate the FBG sensors and to channel the reflected light to the AWG 31. The coupler 50 in non-limiting embodiments can either be a polarizing beam splitter or a non-polarizing beam splitter as illustrated in FIG. 5B or an optical circulator as illustrated in FIG. 5C. A beam splitter is an optical device that splits a beam of light in two. Referring to FIG. 5B, a fraction of the light incident through port 1 is transmitted into port 2 the other fraction is reflected into port 3. The light from port 3 is partially reflected at the FBGs and incident back through port 3. A fraction of the light incident through port 3 is transmitted into port 1 the other fraction is reflected into port 4. With respect to the embodiment of FIG. 5A, port 4 of the beam splitter may be used to provide light reflected by the FBGs 13 to the input channel 36 of the AWG 31. Referring to FIG. 5C, an optical circulator is a passive device, in which a light beam entering any port is transmitted to the next port in rotation only. Light incident through port 1 is transmitted into port 2. The light from port 2 is partially reflected at the FBGs and incident back through port 2. Light incident through port 2 is transmitted into port 3. With respect to the embodiment of FIG. 5A, port 3 of the optical circulator may be used to provide light reflected by the FBGs 13 to the input channel 37 of the AWG 31.

Figure 6:
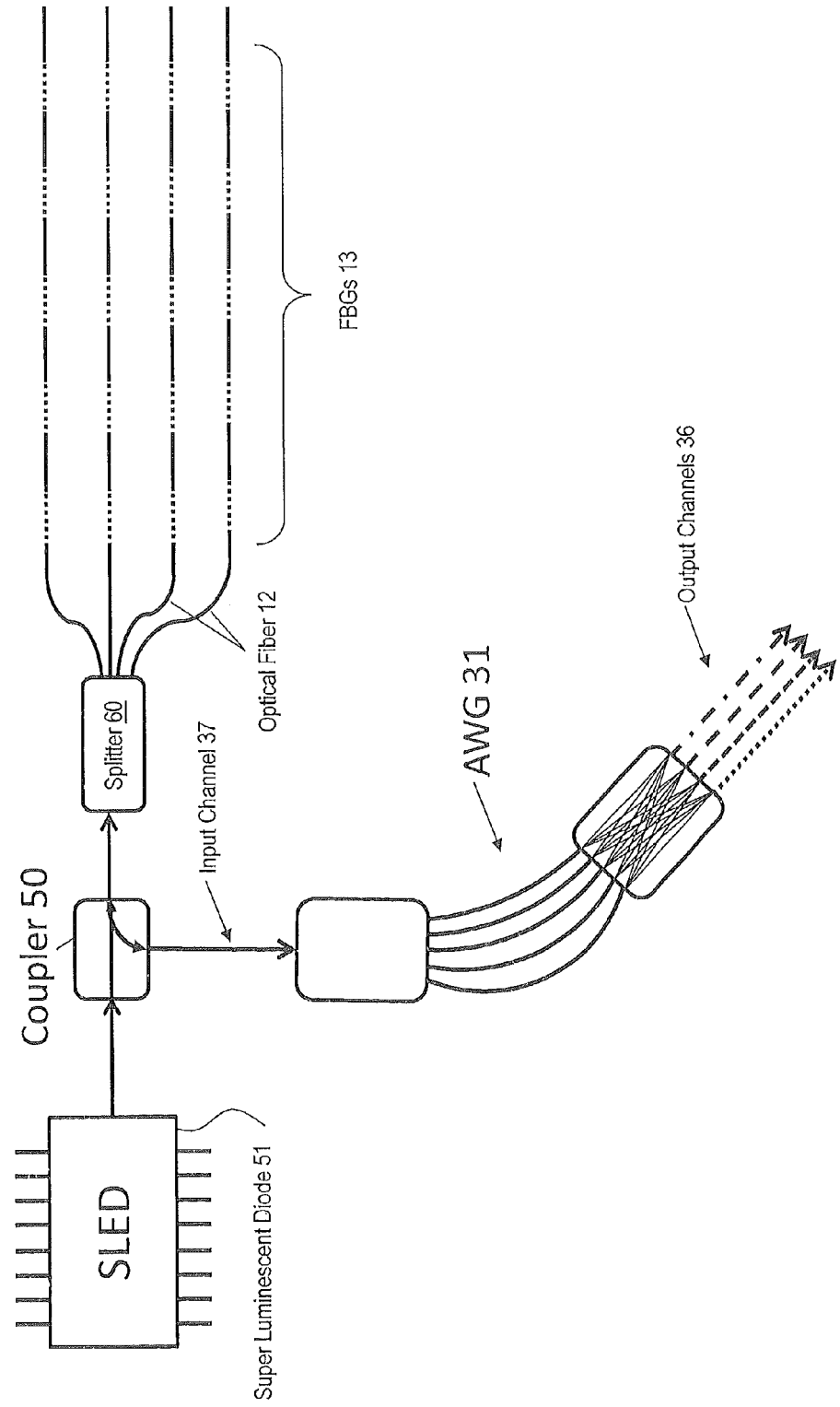
FIG. 6 depicts aspects of a sensor array having multiple optical sensing fibers with distributed sensors that are illuminated by a single super luminescent diode.

FIG. 6 depicts aspects of an array of FBG sensors in multiple optical fibers 12. In addition to using the coupler 50, this embodiment also uses a beam splitter 60 for de-multiplexing input light to the multiple optical fibers and then multiplexing the reflected light to be transmitted to the AWG 31.

Figure 7:
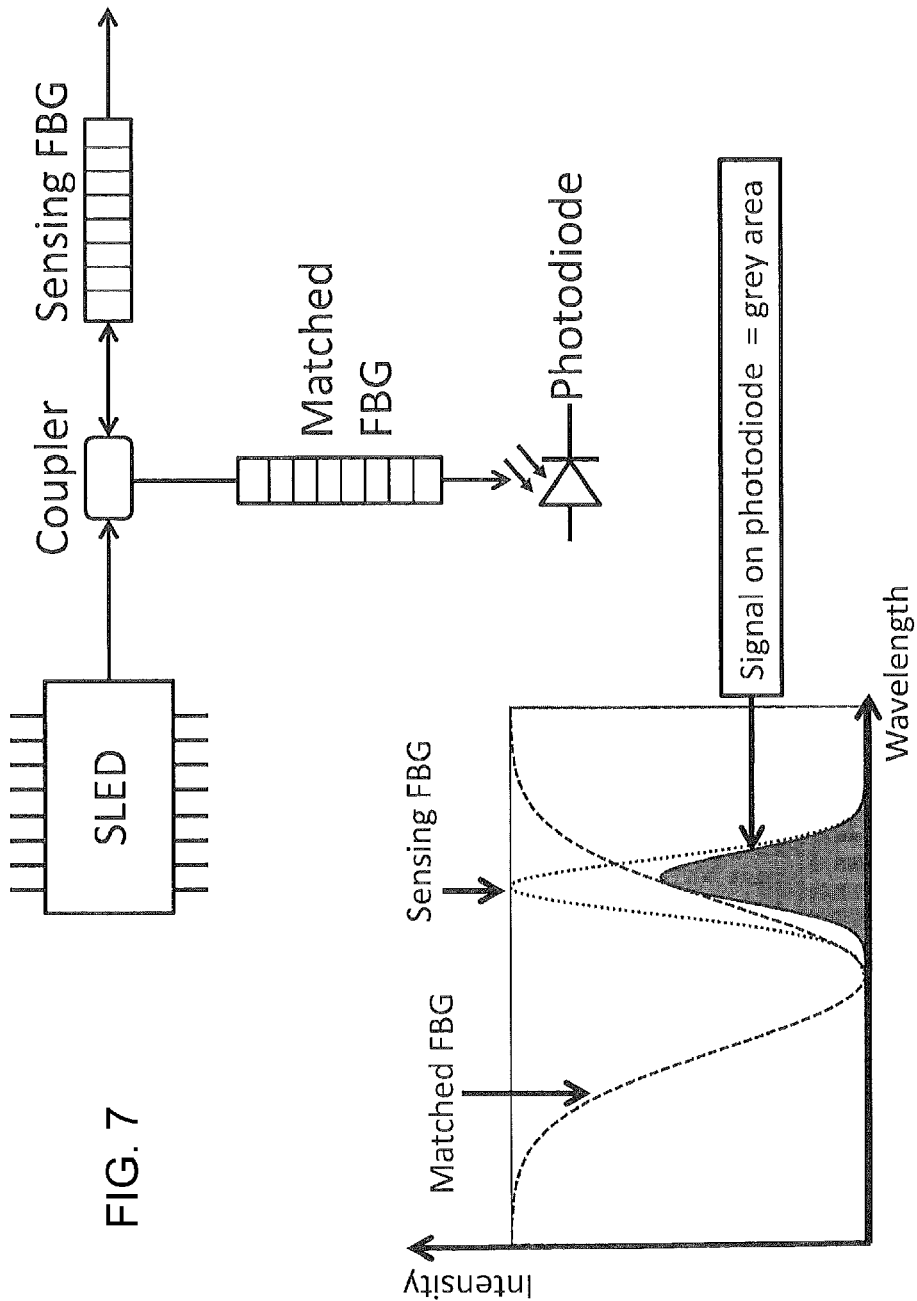
FIG. 7 depicts aspects of an embodiment of a sensor array having one optical fiber and a matched FBG.

FIG. 7 depicts aspects of an embodiment using the super luminescent diode 51 for illuminating one optical fiber having one fiber Bragg grating. The reflected light from the FBG is transmitted through a second FBG which is matched to the first FBG in the sense that the central wave-lengths of both FBGs are the same or close enough to each other (i.e., matched optical characteristics) to provide desired measurement accuracy. The reflected light of the sensor FBG creates a superposition on the transmission characteristic of the second FBG. The signal detected at the photodiode is a measure for the shift in wavelength between both FBGs. When keeping the wavelength of the matched FBG constant a shift in wavelength of the sensing FBG caused by strain, temperature or shift in refractive index of the fiber, results in a signal variation at the photodiode as illustrated in the graph in the lower left of the figure.

Figure 8:
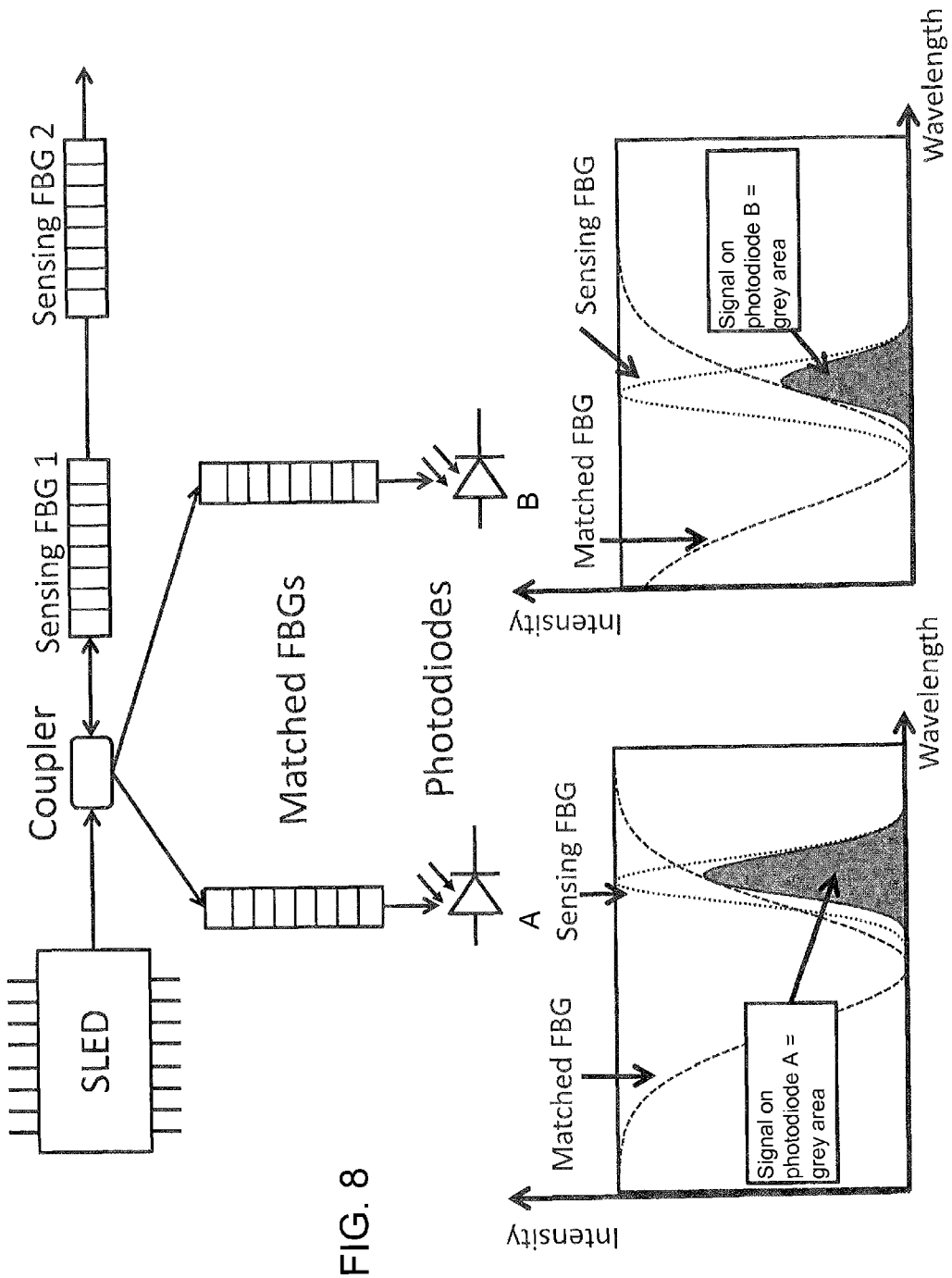
FIG. 8 depicts aspects of an embodiment a sensor array having two optical fibers and two matched FBGs.

FIG. 8 depicts aspects of an embodiment using the super luminescent diode 51 for illuminating one optical fiber having two fiber Bragg gratings. Each of the sensing FBGs are accompanied by a matched FBG in the interrogator area of the system. The matched FBGs are kept constant with respect to the property the sensing FBGs are supposed to measure. For example, a strain-variation provided to the sensing FBGs results in a wavelength shift of the reflected light. Subsequently, the light passing through the respective matched FBG is varying with respect to the strain variation. The signal from each of the two photodiodes is illustrated in the lower part of the figure.

Figure 9:
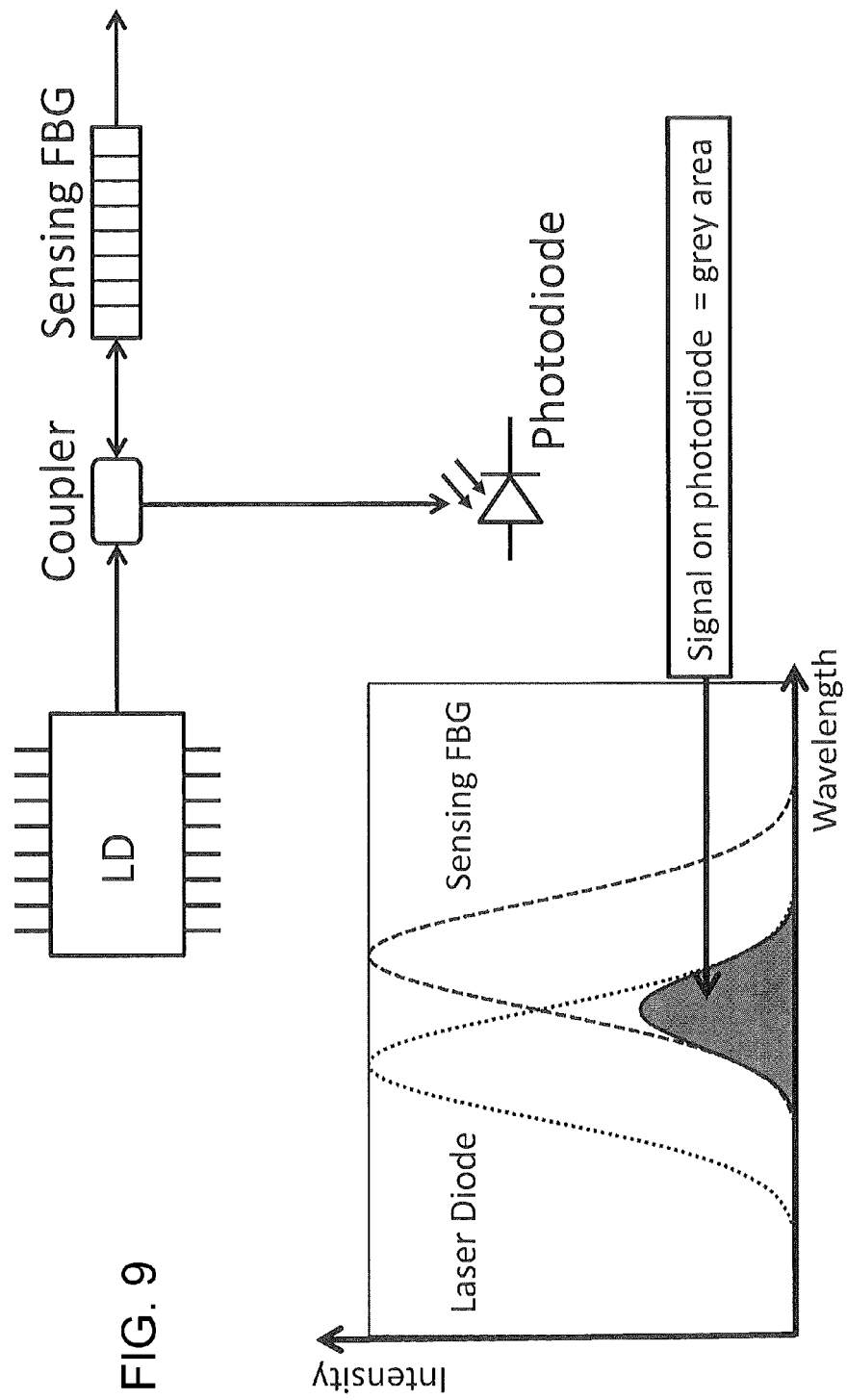
FIG. 9 depicts aspects of an embodiment using a laser diode for illuminating one optical fiber having one fiber Bragg grating.

FIG. 9 depicts aspects of an embodiment using a laser diode 90 for illuminating one optical fiber having one fiber Bragg grating. In this embodiment the central wavelength of the sensing FBG is positioned at the slope of the transmission curve of the laser diode. Any variation in wavelength of the FBG results in a variation of the received signal on the photodiode. The Laser diode (LD) in FIG. 9 can be replaced by a SLED complemented by an optical filter to create the slope of wavelength. The filter can be any kind of optical filter such as FBGs. The signal from the photodiode is illustrated in the lower left of the figure.

Figure 10:
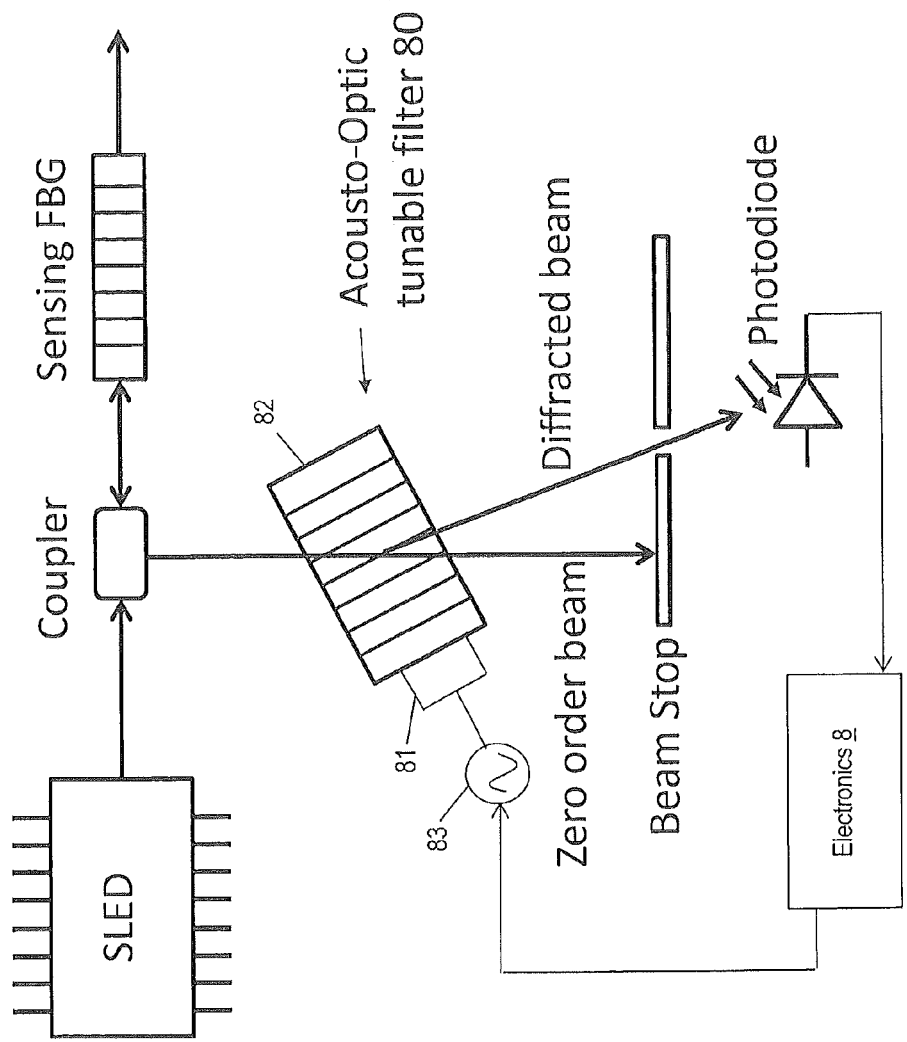
FIG. 10 depicts aspects of an embodiment using an acousto-optic tunable filter interrogator.

FIG. 10 depicts aspects of an embodiment using an acousto-optic tunable filter (AOTF) interrogator 80. The AOTF interrogator 80 is based on acoustic diffractions of light in an anisotropic medium. This interrogator includes a piezoelectric transducer 81 bonded to a birefringent crystal 82. When the transducer 81 is excited by an applied radio frequency (RF) signal from a variable frequency RF signal generator 83, acoustic waves are generated in the crystal 82. The propagating acoustic waves produce a periodic modulation of the index of refraction of the crystal 82. This provides a moving phase grating that will diffract portions of an incident beam. For a fixed acoustic frequency, only a limited band of optical frequencies can satisfy the phase-matching condition and be cumulatively diffracted. As the RF frequency is changed by the variable frequency RF signal generator 83 controlled by the electronics 8, the center of optical pass band is changed accordingly so that the phase-matching condition is maintained. In a tellurium dioxide (TeO2) noncollinear AOTF, the acoustic and optical waves propagate at quite different angles through the crystal. In this configuration, the zero-order and diffracted beam are physically separated, so that the filter can be operated without polarizers. Hence, the AOTF interrogator 80 can be used to measure an intensity of light at specific wavelengths and, thus interrogate each FBG sensor.

Figure 11:
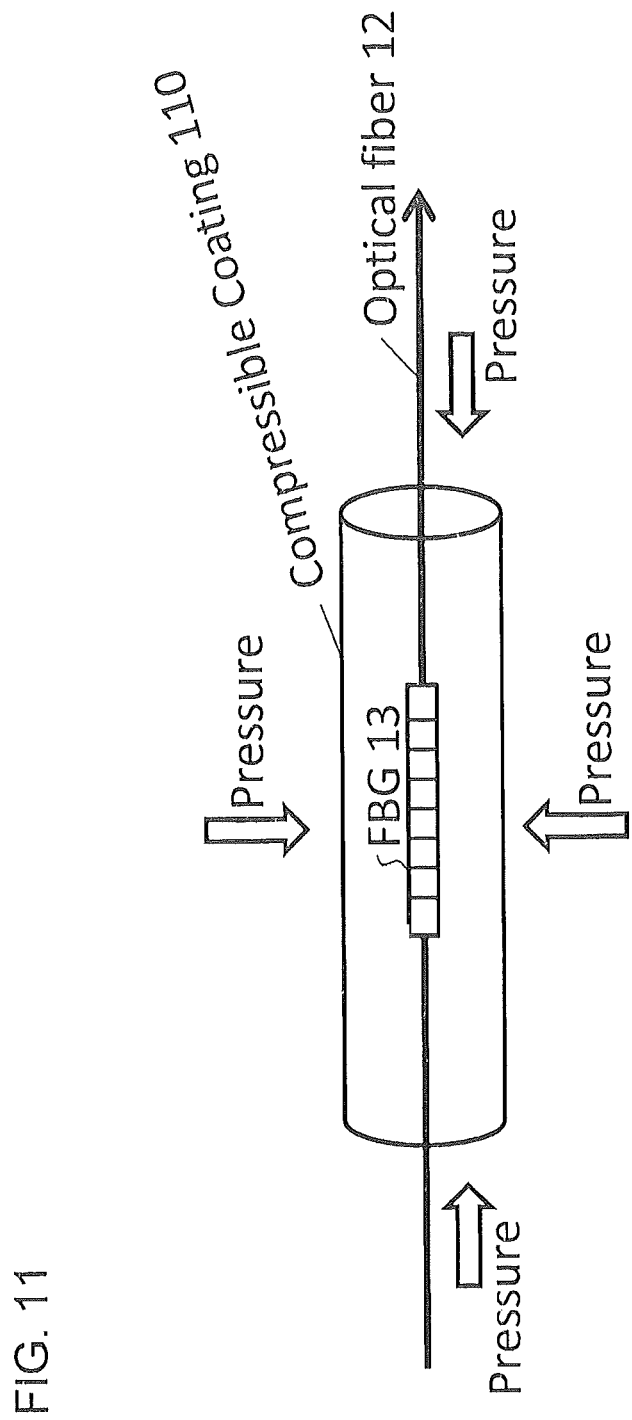
FIG. 11 depicts aspects of an embodiment of a coated fiber Bragg grating to sense pressure.

FIG. 11 depicts aspects of an embodiment of coated fiber Bragg grating. In this embodiment, the FBG is encapsulated in a compressible coating 110 enabling the FBG to be configured to sense pressure such as acoustic waves such as sound waves. A benefit of the coating 110 is that it can protect the FBG from the outside environment such as an ocean or downhole environment. The compressible coating can be formed by a silicon rubber or a coating made from a plastic material such as Teflon or Epoxy resin.

Figure 12:
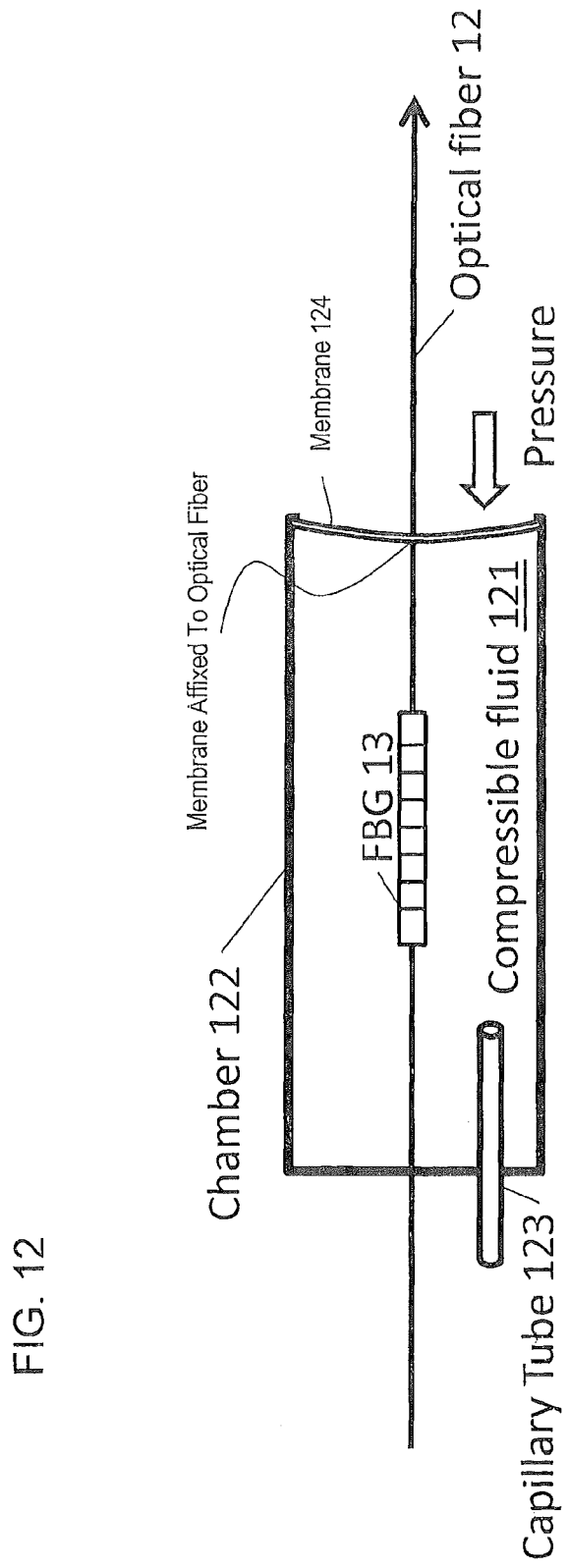
FIG. 12 depicts aspects of a first embodiment of a hydrostatic pressure compensated fiber Bragg grating to sense pressure fluctuations.

FIG. 12 depicts aspects of an embodiment of a hydrostatic pressure compensated fiber Bragg grating. Hydrostatic compensation allows the FBG to be more sensitive to acoustic signals at high downhole pressures than if there was no hydrostatic compensation. That is, the acoustic signal can be sensed without being overwhelmed by the high downhole pressures. In this embodiment, the FBG is encapsulated in a compressible fluid 121 contained in a chamber 122. Outside pressure to be sensed is communicated with the FBG via a flexible membrane 124 affixed to the optical fiber 12. Acoustic signals thus cause a strain on the optical fiber and thus the FBG. Outside pressure is communicated with the compressible fluid 121 by a capillary tube 123 for hydro-static compensation. In that the cross-sectional area of the capillary tube 123 is much less (e.g., less than $\frac{1}{100}^{th}$) than the cross-sectional area of the membrane 124, the acoustic signals are picked up by the membrane 104 while the capillary tube 123 provides hydrostatic compensation. An additional benefit of this configuration is that the FBG is protected from the outside environment such as a downhole environment.

Figure 13:
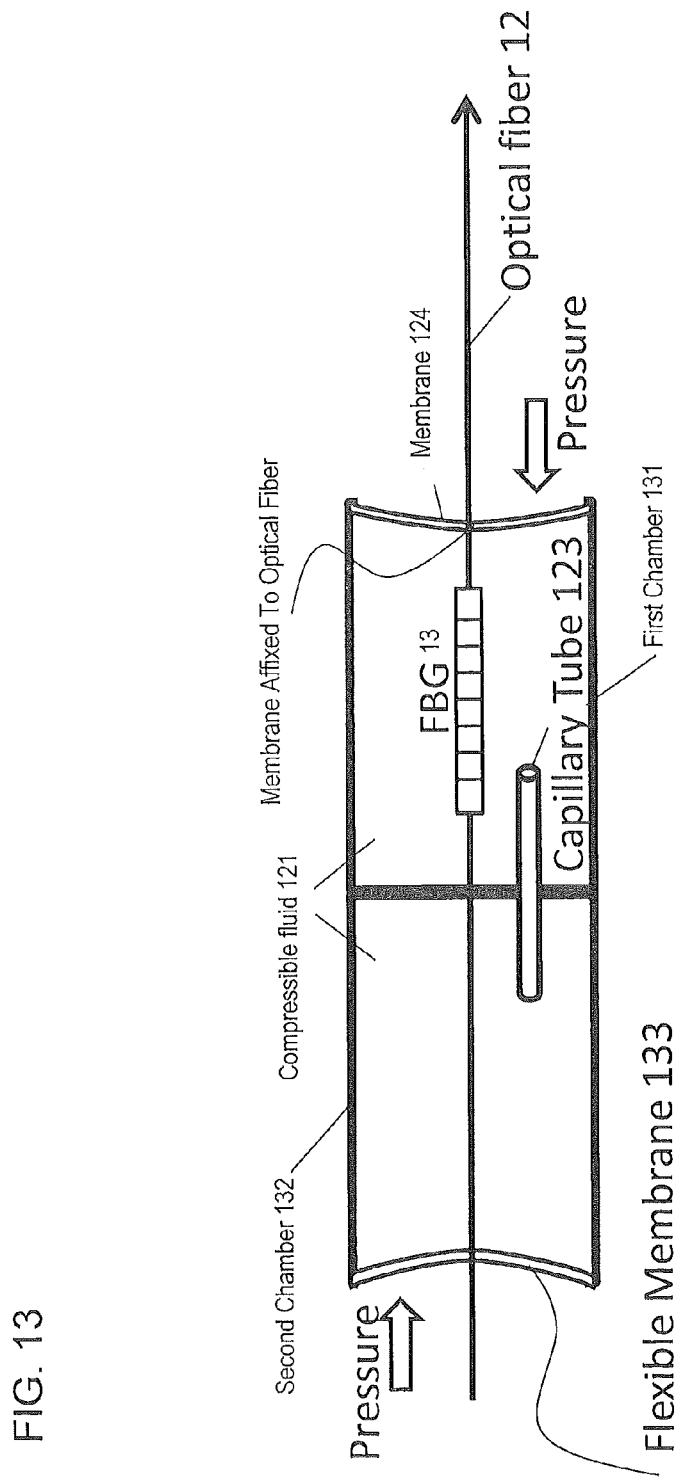
FIG. 13 depicts aspects of a second embodiment of a hydrostatic pressure compensated fiber Bragg grating to sense pressure fluctuations.

FIG. 13 depicts aspects of yet another embodiment of a hydrostatic pressure compensated fiber Bragg grating. In this embodiment, the FBG is encapsulated in the compressible fluid 121 contained in a first chamber 131. Outside pressure to be sensed is communicated with the FBG by the flexible membrane 124 affixed to the optical fiber 12. A second chamber 132 containing the compressible fluid 121 is in pressure communication with the first chamber 131 via the capillary tube 123. While outside pressure is communicated with the second chamber 132 via a flexible membrane 133, hydrostatic compensation in the first chamber 131 is provided by the capillary tube 123.

Figure 14:
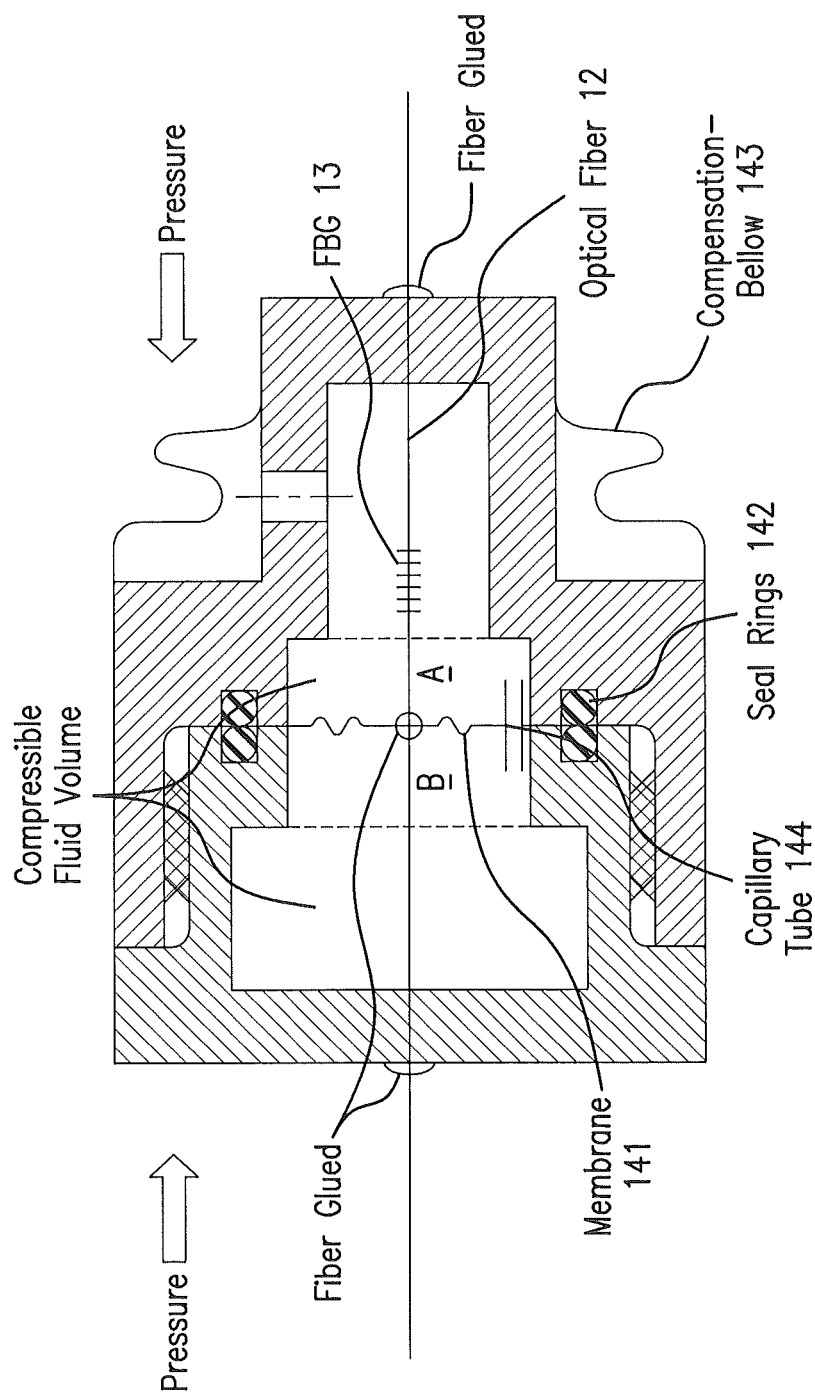
FIG. 14 depicts aspects of an embodiment of a hydrostatic pressure compensated fiber Bragg grating configured as a hydrophone having a compensation-bellow.

FIG. 14 depicts aspects of yet another embodiment of a hydrostatic pressure compensated fiber Bragg grating. The optical fiber is guided through a housing 140 containing the compressible fluid. The housing is screwed together by two parts 140A and 140B. A membrane 141 separates the inside of the housing into two compartments, A and B. The membrane 141 is sealed with two seal rings 142 at the interface between the two parts of the housing. The pressure in the first compartment A is compensated against the static pressure that is outside the housing by a conical compensation bellow 143. The second compartment B is connected via a capillary tube 144 and by the membrane 141 with the first compartment. The slow varying static pressure is equalized between the two compartments by the capillary tube 144, while the high frequency acoustic pressure is acting on the membrane and moving the membrane in the frequency of the acoustic pressure. The motion of the membrane 141 is causing strain in the glued on optical fiber. The FBG 13 is on the fiber in the first compartment. The strain in the FBG causes the wavelength to shift. The shift can be sensed by a connected downhole optical interrogator.

Next, a method for sensing a parameter beneath a surface of the earth is discussed. A first step calls for disposing an optical fiber beneath a surface of the earth, the optical fiber having at least one fiber Bragg grating sensor configured to sense the parameter. Non-limiting embodiments of the parameter include temperature, strain, and acoustic waves or wave amplitudes over time such as acoustic sounds. A second step calls for illuminating the at least one fiber Bragg grating sensor using a wide-band light source disposed beneath the surface of the earth, the light source being configured to emit light in a wide band of wavelengths. A third step calls for receiving light reflected by the at least one fiber Bragg grating sensor using an optical interrogator disposed beneath the surface of the earth, the optical interrogator being configured to transform a shift in wavelength of the reflected light into a variation of light intensity. The shift in wavelength may be measured by measuring the shift of the central wavelength of a distribution of wavelengths. A fourth step calls for measuring intensity of light received from the optical interrogator using a photo-sensor disposed beneath the surface of the earth. Non-limiting embodiments of the photo-sensor include a photodiode in which the output of the photodiode corresponds to the intensity of the received light, a SLED, and a pyroelectric sensor. A fifth step calls for measuring a voltage representing the light intensity at the photo-sensor to sense the parameter using electronics coupled to the photo-sensor.

The above method for sensing a parameter beneath a surface of the earth may also include compensating for hydrostatic pressure by using at least one fiber Bragg grating sensor that is configured to sense acoustic wave amplitude. The method for compensating for hydrostatic pressure may include: immersing the at least one fiber Bragg grating sensor in a compressible fluid; communicating outside pressure with the compressible fluid using a capillary tube; and sensing the acoustic wave amplitude using a flexible membrane affixed to the optical fiber. The above method for sensing a parameter beneath a surface of the earth may also include broadcasting the acoustic sounds sensed by at least one of the fiber Bragg grating sensors to a user using a loudspeaker. The acoustic sounds are obtained by using the FBG sensors as microphones that measure acoustic wave amplitude over time. The above method for sensing a parameter beneath a surface of the earth may also include affixing the optical fiber to a downhole structure, wherein the sensed parameter is temperature or strain experienced by the downhole structure. The above method for sensing a parameter beneath a surface of the earth may also include transmitting a signal having the sensed parameter to a signal receiving device. The signal receiving device may be a display or printer for presenting the sensed parameter to a user. Alternatively or in addition, the signal receiving device may also be memory or a storage medium for storing the sensed parameter. The above method for sensing a parameter beneath a surface of the earth may also include transmitting an alert signal to a user if the sensed parameter exceeds a threshold value.

In support of the teachings herein, various analysis components may be used, including a digital and/or an analog system. For example, the optical sensing system 10, the optical interrogator 11, electronics 8 and/or the computer processing system 9 may include digital and/or analog systems. The system may have components such as a processor, storage media, memory, input, output, communications link (wired, wireless, optical or other), user interfaces (e.g., a display or printer), software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply (e.g., at least one of a generator, a remote supply and a battery), cooling component, heating component, magnet, electromagnet, sensor, electrode, transmitter, receiver, transceiver, antenna, controller, optical unit, electrical unit or electromechanical unit may be included in support of the various aspects discussed herein or in support of other functions beyond this disclosure.

Elements of the embodiments have been introduced with either the articles "a" or "an." The articles are intended to mean that there are one or more of the elements. The terms "including" and "having" and the like are intended to be inclusive such that there may be additional elements other than the elements listed. The conjunction "or" when used with a list of at least two terms is intended to mean any term or combination of terms. The term "configured" relates one or more structural limitations of a device that are required for the device to perform the function or operation for which the device is configured.

While one or more embodiments have been shown and described, modifications and substitutions may be made thereto without departing from the spirit and scope of the invention. Accordingly, it is to be understood that the present invention has been described by way of illustrations and not limitation.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for sensing a parameter beneath a surface of the earth, the apparatus comprising:
    an optical fiber disposed beneath a surface of the earth and comprising at least one fiber Bragg grating sensor configured to sense the parameter, wherein the at least one fiber Bragg grating is pressure compensated and the at least one fiber Bragg grating is immersed in a compressible fluid for the pressure compensation;
    a flexible membrane coupled to the optical fiber and configured to sense acoustic wave amplitude;
    a wide-band light source disposed beneath the surface of the earth and configured to emit light in a wide band of wavelengths, the light source being in optical communication with the optical fiber in order to illuminate the at least one fiber Bragg grating;
    an optical interrogator disposed beneath the surface of the earth and configured to receive light reflected by the at least one fiber Bragg grating sensor and to transform a shift in wavelength of the reflected light into a variation of light intensity,
    a photo-sensor disposed beneath the surface of the earth and configured to measure intensity of light received from the optical interrogator; and
    electronics coupled to the photo-sensor and configured to measure a voltage representing the light intensity at the photo-sensor to sense the parameter.

2. The apparatus according to claim 1, wherein the at least one fiber Bragg grating sensor comprises a series of fiber Bragg grating sensors that are configured to sense acoustic wave amplitude.

3. The apparatus according to claim 1, further comprising a capillary tube configured to communicate hydrostatic pressure at a location the at least one fiber Bragg grating to the compressible fluid.

4. The apparatus according to claim 1, wherein the optical interrogator comprises an arrayed waveguide grating.

5. The apparatus according to claim 1, wherein the optical interrogator comprises at least one matched fiber Bragg grating forming an intersecting wavelength with the at least one fiber Bragg grating sensor.

6. The apparatus according to claim 1, wherein the wide-band light source is configured to emit light within a range of wavelengths from 5 nm to 100 nm.

7. The apparatus according to claim 1, wherein the wide-band light source comprises a super luminescent diode.

8. The apparatus according to claim 1, wherein the wide-band light source comprises a wide-band laser diode.

9. The apparatus according to claim 1, wherein the photo-sensor comprises a photodiode.

10. The apparatus according to claim 9, wherein the photodiode comprises a plurality of photodiodes with each photodiode in the plurality of photodiodes corresponding to a unique output channel in the optical interrogator.

11. The apparatus according to claim 1, wherein the photo-sensor comprises a pyroelectric sensor.

12. The apparatus according to claim 1, wherein the optical fiber comprises a plurality of optical fibers with each optical fiber in the plurality of optical fibers comprising a series of fiber Bragg grating sensors configured to sense the parameter.

13. The apparatus according to claim 1, wherein the optical fiber is affixed to a downhole structure and the sensed parameter is temperature or strain.

14. The apparatus according to claim 1, wherein the optical interrogator comprises an acousto-optic tunable filter.

15. The apparatus according to claim 1, wherein the optical interrogator comprises at least one fiber Bragg grating matched to optical characteristics of the at least one fiber Bragg grating sensor.

16. A method for sensing a parameter beneath a surface of the earth, the method comprising:
    disposing an optical fiber beneath a surface of the earth, the optical fiber comprising at least one fiber Bragg grating sensor configured to sense the parameter;
    compensating for hydrostatic pressure by: immersing the at least one fiber Bragg grating sensor in a compressible fluid; communicating outside pressure with the compressible fluid using a capillary tube; and sensing the acoustic wave amplitude using a flexible membrane affixed to the optical fiber;
    illuminating the at least one fiber Bragg grating sensor using a wide-band light source disposed beneath the surface of the earth, the light source being configured to emit light in a wide band of wavelengths;
    receiving light reflected by the at least one fiber Bragg grating sensor using an optical interrogator disposed beneath the surface of the earth, the optical interrogator being configured to transform a shift in wavelength of the reflected light into a variation of light intensity;
    measuring intensity of light received from the optical interrogator using a photo-sensor disposed beneath the surface of the earth;
    measuring a voltage representing the light intensity at the photo-sensor to sense the parameter using electronics coupled to the photo-sensor.

17. The method according to claim 16, wherein the at least one fiber Bragg grating sensor is configured to sense acoustic wave amplitude.

18. The method according to claim 17, wherein the acoustic wave amplitude comprises acoustic sounds and the method further comprises broadcasting the acoustic sounds sensed by the at least one of the fiber Bragg grating sensor to a user using a loudspeaker.

19. The method according to claim 16, further comprising affixing the optical fiber to a downhole structure and wherein the parameter is temperature or strain.

\* \* \* \* \*